United States Patent
Kubinec

[11] Patent Number: 5,900,834
[45] Date of Patent: May 4, 1999

[54] DOPPLER SHIFT DETECTOR

[75] Inventor: James J. Kubinec, Reno, Nev.

[73] Assignee: Advanced Micro Devices, Inc., Sunnyvale, Calif.

[21] Appl. No.: 08/992,626

[22] Filed: Dec. 18, 1997

[51] Int. Cl.$^6$ ............... G01S 13/16; G01S 7/02; G01S 15/50
[52] U.S. Cl. ............ 342/115; 342/195; 367/90; 367/94
[58] Field of Search .................. 342/104, 115, 342/195, 200, 28; 367/90, 94

[56] References Cited

U.S. PATENT DOCUMENTS

| | | |
|---|---|---|
| 4,398,274 | 8/1983 | Chotiros ................. 367/90 |
| 5,132,572 | 7/1992 | Woo . |
| 5,220,216 | 6/1993 | Woo . |
| 5,227,679 | 7/1993 | Woo . |
| 5,264,745 | 11/1993 | Woo . |
| 5,349,612 | 9/1994 | Guo et al. . |
| 5,363,419 | 11/1994 | Ho . |
| 5,367,542 | 11/1994 | Guo . |
| 5,400,370 | 3/1995 | Guo . |
| 5,452,333 | 9/1995 | Guo et al. . |
| 5,457,336 | 10/1995 | Fang et al. . |
| 5,457,719 | 10/1995 | Guo et al. . |

*Primary Examiner*—Ian J. Lobo

[57] ABSTRACT

A Doppler shift detector for determining the Doppler shift between a transmit signal and a receive signal uses clocked delay lines. The clocked delay lines count the number of edges in an applied signal thereto (e.g. the receive signal) at various positions in the delay line in accordance with a clock signal. Period detection logic ascertains the mean position of counted edges and thence the period of the applied signal. The Doppler shift is then calculated from the measured periods of the transmit signal and receive signal. The delay line for the receive signal is clocked by either the receive signal itself or the transmit signal.

21 Claims, 6 Drawing Sheets

DOPPLER SHIFT DETECTOR

TECHNICAL FIELD

The present invention relates to detecting a Doppler shift and, more particularly, to an improved circuit and methodology for detecting a Doppler shift using delay line techniques.

BACKGROUND ART

The Doppler shift is the observed change in frequency of a wave due to the relative velocity between an observer and the object from which the wave emanates. This change in frequency is directly and linearly dependent on the relative velocity. As a result, the Doppler shift is useful in many systems, e.g. a Doppler radar, to detect the speed of target objects.

A typical Doppler radar emits a periodic electromagnetic wave, for example at a frequency of 13.325 GHz, toward a target object. Some portion of the transmit signal is reflected, or "echoed," back to the radar where it is received. The relative velocity between the source and the target results in a Doppler shift in the frequency of the echoed signal. By measuring the frequency shift of the reflected wave, circuitry in a Doppler radar can determine how fast the target is moving relative to radar.

For example, Doppler radar devices used in meteorology can determine how a fast storm front is approaching by measuring the Doppler shift of a signal reflected off condensation in a rain cloud. Another application of Doppler radar includes Doppler navigation for determining the airspeed of a jet, i.e. the relative velocity between the aircraft and a fixed point on the ground.

Doppler shift detectors can also be used in sonar devices, which generate and emit a sound wave that is reflected off a target object. This sound wave too will undergo a frequency shift based on the relative velocity between the sonar device and the target object.

Since the Doppler shift can be a very small fraction of the transmitter frequency, conventional Doppler systems are generally incapable of measuring the frequencies of the transmit signal and the receive signal to a sufficient degree of precision to detect the Doppler shift. Therefore, conventional systems do not measure the frequency of the echoed wave directly, Instead, they measure the beat frequency shift of a signal derived from adding the echo signal to a reference signal generated from the transmitter.

Conventional techniques for detecting Doppler shifts, therefore, use analog circuitry or are otherwise difficult to implement on a monolithic semiconductor substrate of an integrated circuit, e.g., in CMOS technology.

DISCLOSURE OF THE INVENTION

There is a need for a circuit which can measure the frequency of a periodic signal to a high degree of precision. There is also a need for a Doppler detector than can be implemented effectively on a monolithic semiconductor substrate, especially in CMOS technology.

These and other needs are met by the present invention, in which clocked delay lines are used to count the number of prescribed characteristics such as edges in a signal applied thereto (i.e. the transmit signal and the receive signal) at various positions in the delay line. Period detection logic is used to ascertain the mean position of counted edges and thence the period of the applied signal. The Doppler shift is calculated from the measured periods of the transmit signal and receive signal.

Accordingly, one aspect of the invention is a detector for determining a Doppler shift between a transmit signal and a receive signal. The detector includes a chain of delay stages coupled in series arranged to receive and repeatedly delay the receive signal. Signal detection logic coupled to inputs and outputs of selected delay stages output signals that indicate a prescribed characteristic, e.g. an edge, of the receive signal at the respective delay stages. Counters, responsive to a common clock signal, are coupled to the signal detection logic for counting the numbers of detected characteristics. Period detection logic coupled to the counters is configured to determine the period of the receive signal based on the counted numbers of detected characteristic. Doppler shift detection logic coupled to the period detection logic determines the Doppler shift between the transmit signal and the receive signal based on the determined period of the receive signal and the period of the transmit signal.

The period detection logic may include top point logic for determining a mean position of the detected characteristics and calculation logic for determining the period of the receive signal based on the determined mean position.

In accordance with another aspect of the present invention, a method of detecting a Doppler shift between a transmit signal and a receive signal includes the step of determining the period of the transmit signal. The receive signal is repeatedly delayed by a common delay period, and a prescribed characteristic is detected in the repeatedly delayed receive signal. The period of the receive is determined based on the detected prescribed characteristics, for example, by counting the number of detected edges in response to a clock signal, determining a mean position of the counted, detected edges, and determining the period based on the mean position. The Doppler shift is determined based on the determined period of the receive signal and the period of the transmit signal.

Additional objects, advantages, and novel features of the present invention will be set forth in part in the detailed description which follows, and in part will become apparent upon examination or may be learned by practice of the invention. The objects and advantages of the invention may be realized and obtained by means of the instrumentalities and combinations particularly pointed out the appended claims.

BRIEF DESCRIPTION OF DRAWINGS

The present invention is illustrated by way of example, and not by limitation, in the figures of the accompanying drawings, wherein elements having the same reference numeral designations represent like elements throughout and wherein:

FIG. 1(*b*) is an exemplary histogram analyzed by an embodiment of the present invention.

FIG. 2(*b*) is another exemplary histogram analyzed by an embodiment of the present invention.

FIGS. 3(*b*) and 3(*c*) are circuit diagrams of a non-inverting delay stage and inverting delay stage that may be used to implement a delay stage depicted in FIG. 3(*a*).

BEST MODE FOR CARRYING OUT THE INVENTION

A circuit and method for detection of a Doppler shift in a receive signal are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

MEASURING SIGNAL FREQUENCY WITH DELAY LINES

Figure 1A:
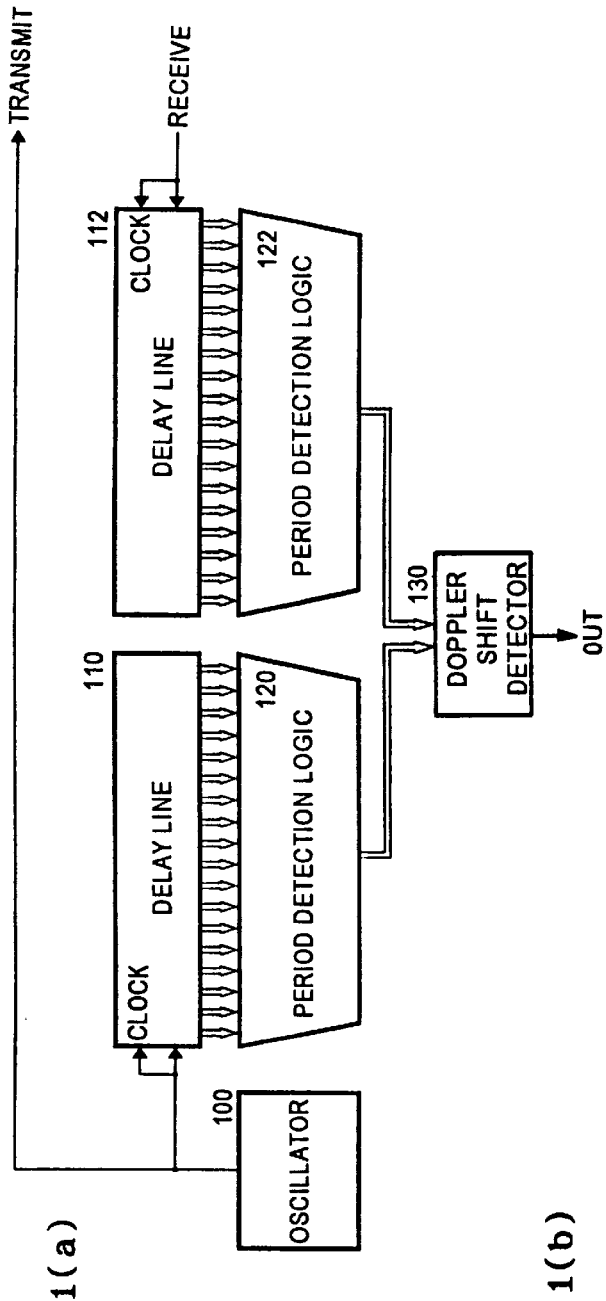
FIG. 1(*a*) is a diagram of a Doppler shift detector according to a first embodiment of the present invention.

Referring to FIG. 1(a), a Doppler shift detector according to one embodiment of the present invention includes an oscillator 100 for generating a signal to be transmitted at a prescribed reference frequency. The oscillator 100 can be a very accurate and precise off-chip crystal oscillator or a ring oscillator implemented on a semiconductor substrate.

The signal generated from the oscillator 100 is transmitted, reflected off a target, and received back as a "receive signal." The receive signal will undergo a Doppler shift in proportion with the relative velocity between the source and the target. Thus, measuring the difference in the frequency of the receive signal and the frequency of the transmit signal allows one to ascertain the relative velocity between the source and the target.

In accordance with the present invention, delay lines are used to determine the frequency of both the transmit signal and the receive signal to a high degree of precision.

A periodic signal, such as a sinusoid wave or square wave, features a regular transition from a low voltage to a high voltage called a "rising edge." Such a periodic signal also features a regular transition from a high voltage to a low voltage called a "falling edge." If the periodic signal is applied to a delay line, the edges occur at regular positions in the delay line. Since each period of the periodic signal has a rising edge and a falling edge, two successive occurrences of a particular edge type can be used to define a period in the periodic signal. Therefore, the period of the periodic signal, and hence the frequency of the signal, can be measured by determining the aggregate delay in the delay line between two successive positions at which a given transition occurs.

Accordingly, the transmit signal, generated from oscillator 100, is applied to a delay line 110 including a chain of serially coupled delay stages for repeatedly delaying the transmit signal by a common delay period. As described in more detail hereinafter, the delay line 110 also includes edge detection logic for determining whether a transition in the applied signal occurs at a delay stage and counters for counting the number of detected edges at selected delay stages in the delay line.

In one embodiment of the present invention, the counters in the delay line 110 are clocked by the same signal that is applied to the delay line. Thus, delay line 110 for detecting and counting edges in the transmit signal is clocked by the transmit signal, and delay line 112 for detecting and counting edges in the receive signal is clocked by the receive signal. By clocking the delay line with the same signal that is being delayed, the regular edge transitions will tend to occur at the same position, i.e. delay stage or element, in the delay line.

Period detection logic 120 is coupled to the delay line for inspecting the counter values of detected edges to determine the period of the applied, transmit signal. Under most if not all operating conditions, there will be some noise or "jitter" in the signal. If the delay period of the delay stages is small enough, for example on the same order of magnitude as the variance of the jitter, then the edge transitions will occur at different delay stages.

Accordingly, the period detection logic 120 includes tap point logic for determining the mean position of the detected edges. This mean position can be expressed as a fractional number of delay stages or "tap points." Thus, the tap point logic calculates an average of the tap point number for the delay stages having detected edges, weighted by the number of detected edges counted for each delay stage.

In fact, the presence of jitter can be exploited to obtain measurements of the mean position of the detected edges having a precision beyond the precision of the individual delay stages. For a very large number of periods, e.g. for hundreds of thousands of cycles, the Law of Large Numbers dictates that the measured mean position tends to the actual mean position for the applied signal. Thus, the extra precision is obtained by sampling the edge transition for very large number of times. Preferably, the delay period of the delay stages lies within a standard deviation ($\sigma$, sigma) or two of the actual mean position for the edge transition.

Figure 1B:
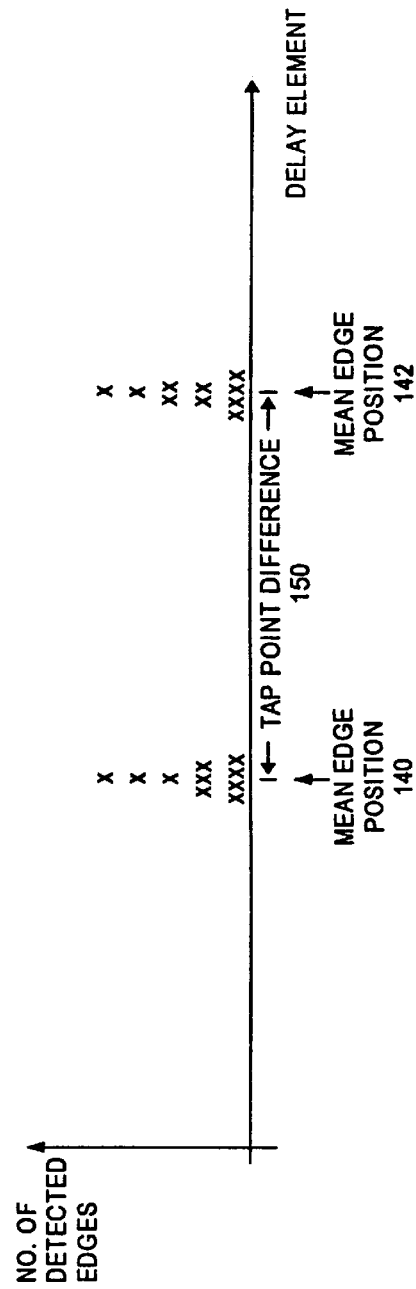

For example, depicted in FIG. 1(b) is an exemplary histogram of counter values for detected edges plotted against respective delay elements. Mean edge position 140 corresponds to the average tap point for the first regular occurrence of a particular edge. If there are two (2) detected transitions at delay element number 34, five (5) detected transitions for tap point 35, two (2) detected transitions for tap point 36, and one (1) transition for tap point 37. Thus, the mean position 140 of the detected edges is: (34·2+35·5+36·2+37·1)/(2+5+2+1)=35.2 tap points.

Similarly, the second occurrence of the transition in the exemplary histogram yields a mean position 150 of the detected edges of: (68·1+69·3+70·5+71·1)/(1+3+5+1)=69.6 tap points. The tap point difference 150, i.e. 69.6−35.2=34.4, is equivalent to the period of the applied signal and can be calculated by such forms of calculation logic as a microprocessor, an arithmetic logic unit, an adder/subtracter combinatorial logic circuit, and the like. In the example, if the common delay period of each delay stage is 70 ps, then the period of the applied signal is 70 ps·34.4=2.41 $\mu$s, which corresponds to a frequency of 415 MHz by taking the reciprocal thereof.

According to the embodiment depicted in FIG. 1(a), the period of the receive signal can be measured by another copy of the delay line 112 and period detection logic 122. When the two delay lines 110 and 112 are manufactured on the same monolithic semiconductor substrate, they generally will be affected by the same variations in manufacturing and operating conditions, and thus their delay elements will tend to have a common delay period. Consequently, the same approach for finding the period of the receive signal can be adopted.

The output of period detection logic 120 and 122 is a multi-bit signal indicative of the period of the transmit signal ($T_t$) and the period of the receive signal ($T_r$), respectively.

The difference in the frequency (Δf) between the transmitted frequency (f$_t$) and the received frequency (f$_r$) can be calculated by Doppler shift detector 130. The Doppler shift detector 130 may be implemented on a monolithic semiconductor substrate in a variety of ways, including a microprocessor, an arithmetic logic unit, and combinatorial logic.

At least one of two approaches may be used. In the first approach, the frequency shift Δf is calculated by taking of the difference of the reciprocals of the respective periods:

$$\Delta f = f_t - f_r = \frac{1}{T_t} - \frac{1}{T_r}$$

In a second approach, the frequency shift Δf is calculated by taking the quotient of the difference of the periods and the product of the periods:

$$\Delta f = f_t - f_r = \frac{T_r - T_t}{T_t T_r}$$

Therefore, by measuring the respective periods of the transmit signal and the receive signal, the Doppler shift in the receive signal, and hence the relative velocity of a target object, can be calculated.

A REFERENCE-CLOCKED DOPPLER DETECTOR

The delay lines 110 and 112 in the embodiment of the present invention depicted in FIG. 1(a) are self-clocked, in the sense that the clock signal provided to each delay line 110 and 112 is the same as the signal being delayed. According to another embodiment of the present invention depicted in FIG. 2(a), on the other hand, the delay line for measuring the period of the receive signal is clocked at the same reference frequency of the transmit signal.

This embodiment of the invention includes an oscillator 200 for generating a signal to be transmitted at a prescribed reference frequency. The period of the transmit signal in this embodiment is measured in the same manner as that of the above-described embodiment. Namely, the generated signal is applied to a self-clocked delay line 210, which counts delayed edges in the applied signal in response to the clock signal. The self-clocked delay line 210 is coupled to the period detection logic 220, which inspects the counter values of the detected edges and determines the period of the applied signal. Further details of the structure and operation of the self-clocked delay line 210 and the period detection logic 220 are illuminated in the discussion hereinabove with respect to the delay line 110 and period detection logic 120.

Figures 2A, 2B:
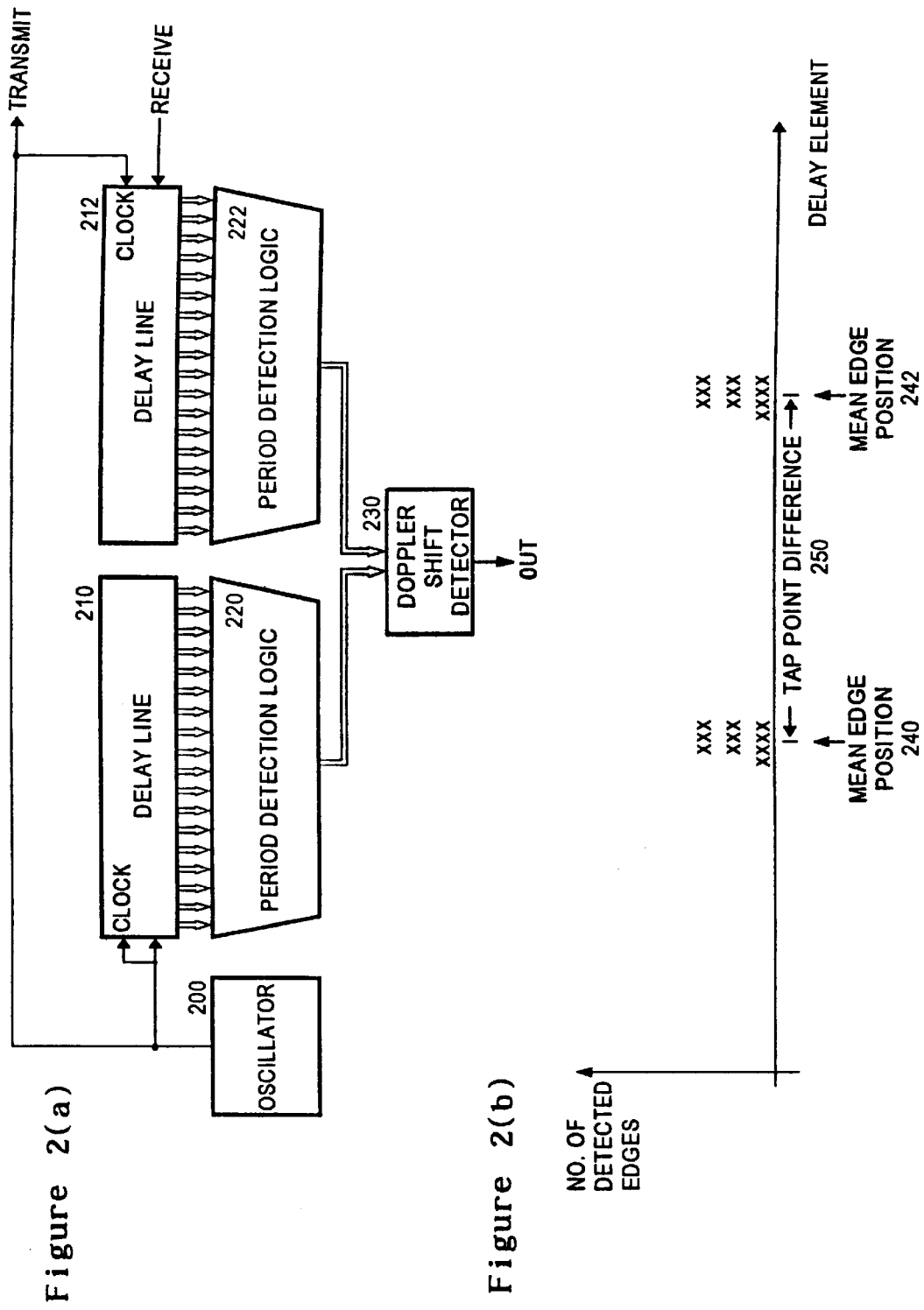
FIG. 2(*a*) is a diagram of a Doppler shift detector according to a second embodiment of the present invention.

The reference-clocked delay line 212 for measuring the period of the receive signal, however, is clocked by the transmit signal in this embodiment, instead of by the receive signal. If there is a difference in the frequency of the transmit signal and the receive signal, the detected edges will tend to drift over the course of many cycles in one direction or the other at a rate proportional to the frequency difference. As illustrated in FIG. 2(b), if the frequency of the receive signal is greater than the frequency of the transmit signal, the detected edges will drift to a position earlier in the delay line.

For example, if the receive signal and the frequency signal differ in one part in 5 million, the detected edges will drift away from their original position by about four delay elements over the course of 200,000 cycles in a delay line 212 having delay elements with a delay period that is about 1/100th of the period of the transmit signal. Since the extent of this drift is equivalent of the tap point difference 250 between two mean edge positions 240 and 242, much of the circuitry of the period detection logic 222 for the reference-clocked delay line 212 can be reused from the implementation of the period detection logic 122. An important difference between the two implementations, however, is that the period detection logic 222 determines the period by an additional step of dividing the tap point difference 250 by the number of cycles counted.

When the period of the transmit signal is determined by the period detection logic 220 and the period of the receive signal is determined by the period detection logic 222, the Doppler shift detector 230 is able to determine the frequency difference as described hereinabove with reference to Doppler shift detector 150.

In some embodiments, the period of the transmit signal may be known to a sufficient degree of precision, for example, if oscillator 100 or 200 are implemented as crystal oscillators. Consequently in these implementations, the circuitry for measuring the period of the transmit signal, i.e. delay line 110/210 and period detection logic 120/220, may be omitted and the Doppler shift detector 130/230 configured to use a hard-coded value of the period of the transmit signal.

DELAY LINE

Figure 3A:
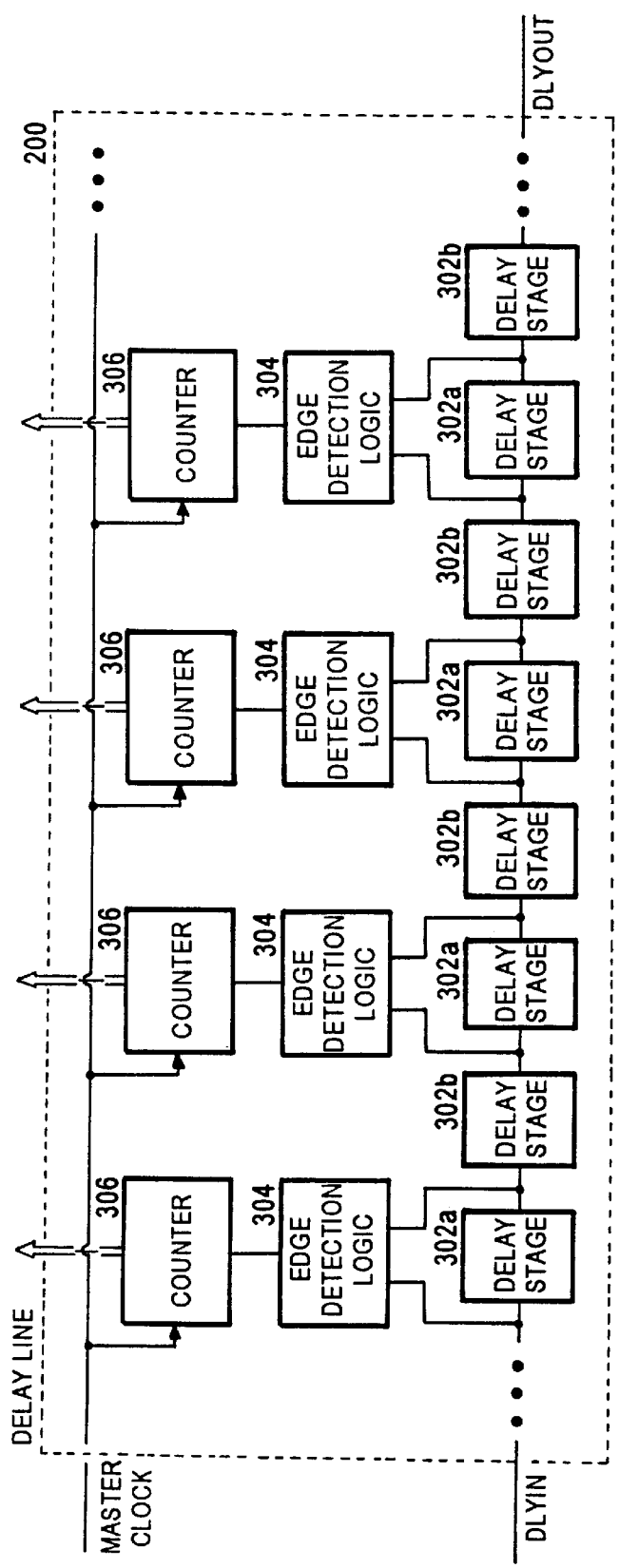
FIG. 3(*a*) is a block diagram of a delay line that may be used to implement the circuits depicted in FIGS. 1(*a*) and 2(*a*).

With reference to FIG. 3(a), a delay line 300 according to an embodiment of the invention comprises a chain of serially coupled delay stages 302a and 302b for repeated delaying a signal applied to the delay line 300. Typically, the delay line will comprise tens of thousands, or more, of these delay stages 302. Coupled to an input and output of at least some of the delay stages 302a, for example after every other delay stage 302a, is edge detection logic 304 for detecting the presence of a recurring signal characteristic, preferably an edge, such as a rising edge or a falling edge in a pulse traveling down the delay line 300.

Each delay stage 302a and 302b may be a non-inverting delay stage or an inverting delay stage. A non-inverting delay stage provides an output signal that is approximately the same as the input signal, except phase shifted by a delay period. According to one implementation, a non-inverting delay stage 310 comprises two conventional inverters coupled in series. In another implementation, depicted in FIG. 3(b), a non-inverting delay stage 310 comprises two inverting delay stages 312-1 and 312-2, depicted in FIG. 3(c), coupled in series.

The delay characteristics of any digital circuit will vary from chip to chip and over time because of unavoidable variations in manufacturing and operating conditions. Preferably, the delay period of each constituent inverting delay stage 312-1 and 312-2 can be synchronized according to a calibration signal as explained with reference to the inverting delay stage 320 depicted in FIG. 3(c).

Figure 3C:
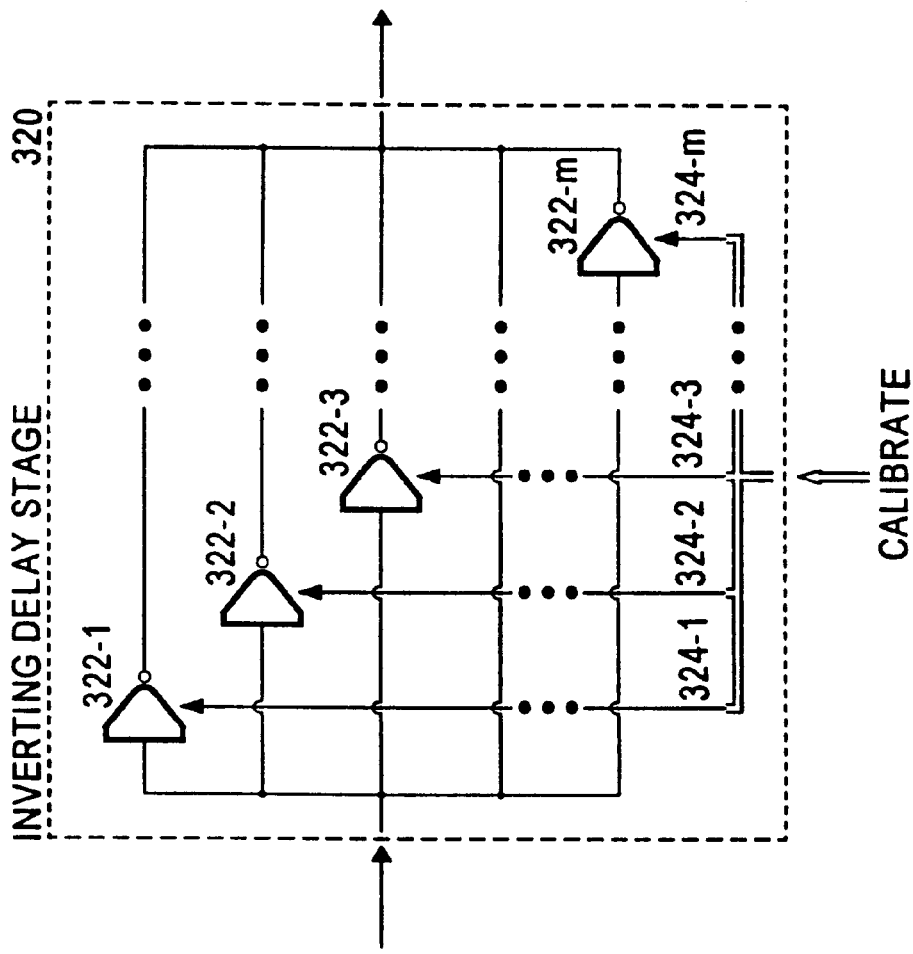
Figure 3B:
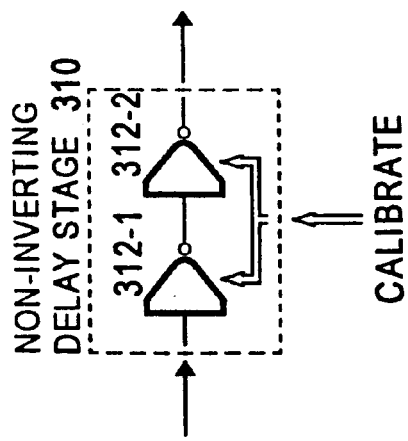

In FIG. 3(c) depicted is an adjustable, inverting delay stage 320 according to one implementation comprising a plurality of switchable inverters 322-1, 322-2, 322-3, to 322-m, which may be enabled or disabled according to a corresponding bit 324-1, 324-2, 324-3, to 324-m in a calibration signal. Enabling or disabling a switchable inverter 322 changes the amount of driving power the inverting delay stage 320 can supply to a load capacitance (not shown) and hence affects the delay time of the inverting delay stage 320. Examples of switchable inverters are described in the commonly assigned U.S. Pat. Nos. 5,220,216 issued to Woo on Jun. 15, 1993 and 5,227,679 issue to Woo on Jul. 13, 1993.

The calibration signal may be produced with reference to a reliable, precise clock signal, e.g. from a crystal oscillator, preferably by an on-chip digital servo circuit (not shown) such as described in the commonly assigned U.S. Pat. No. 5,457,719, issued to Guo et al. on Oct. 10, 1995. Briefly, the on-chip digital servo circuit comprises an adjustable digital delay line of its own, which it monitors and continually adjusts with a calibration signal in a feedback loop.

Accordingly, delay line 300 comprises a series of delay stages 302a and 302b, each of which provides a uniform delay period preferably synchronized to a reference clock period according to a calibration signal. Moreover, each inverting delay stage 320 can have a consistent delay period of as little as 70 ps. Thus, each pair delay stage 302a and 302b or each non-inverting delay stage 310 can have a consistent delay period of as little of 140 ps. Therefore, delay line 300 is high-speed, capable of processing pulses at data rates up to about 7 GHz. Furthermore, digital delay line 300 provides edge detection logic 304 for viewing synoptically any portion of a quantized input signal.

EDGE DETECTION LOGIC

As explained hereinabove, the delay line 300 preferably includes edge detection logic 304 for detecting the edge of a pulse travelling down the delay line 300. The edge detection logic 304 may detect a falling edge, a rising edge, or both edges, and generates a signal, e.g. a high voltage level, indicating the presence of the edge at a delay stage 302a associated with the edge detection logic 304. The edge detection logic 304 may be implemented according to a variety of different approaches depending on the nature of the delay stage, some of which are depicted in FIGS. 4 and 5 for non-inverting delay stages and inverting delay stages, respectively.

Figure 4A:
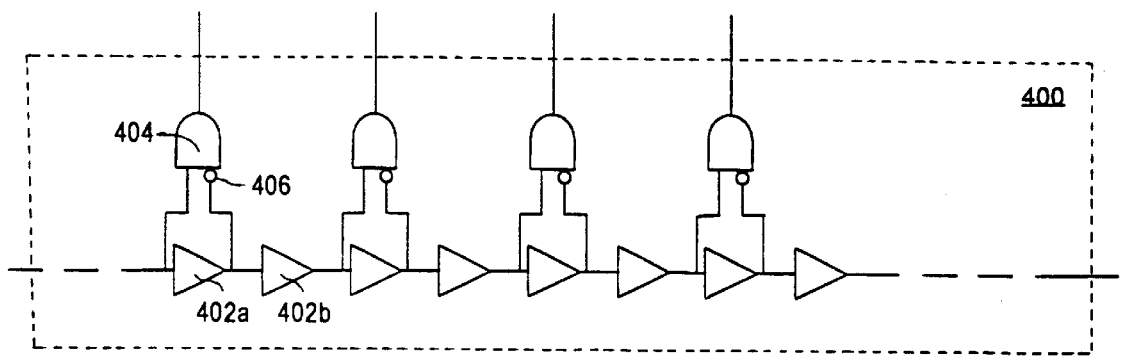
FIGS. 4(a) to 4(e) are circuit diagrams of edge detection logic that may be implemented in conjunction with a non-inverting delay stage.

Referring to FIG. 4(a), a portion of delay line 400 is implemented with non-inverting delay stages 402a and 402b and falling edge detection logic comprising an AND gate 404 and an inverter 406 coupled to the output of non-inverting delay stage 402a. The AND gate 404 is coupled to the output of the inverter 406 and the input of the non-inverting delay stage 402a. When a falling edge of a pulse is being delayed by non-inverting delay stage 402a, the input of the non-inverting delay stage 402a has a high potential level, but the output thereof has a low potential level. Accordingly, the output of inverter 406 in this situation is at a high level and the output of AND gate 404 is high. Preferably, the delay period of inverter 406 is very short compared to the delay period of the non-inverting delay stage 402a for detecting the edge being delayed. When a falling edge of a pulse is not being delayed by the non-inverting delay stage 402a, then one of the inputs to AND gate 404 is low, resulting a low level output. Therefore, a high output of AND gate 404 indicates the presence of a falling edge in a pulse at the delay element 402a and a low output indicates the absence of a falling edge in the pulse at the delay element 402a.

Figure 4B:
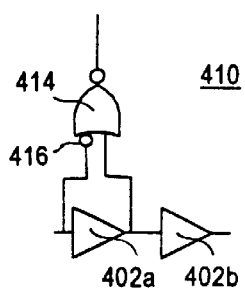

In FIG. 4(b), another implementation of falling edge logic is depicted, comprising an inverter 416 coupled to the input of non-inverting delay stage 402a and a NOR gate 414 coupled to the output of the inverter 416 and the output of the non-inverting delay stage 402a. In this configuration, the output of NOR gate 414 is high only when both inputs are low, that is, when the input to the non-inverting delay stage 402a is currently high and inverted by inverter 416 and when the output of the non-inverting delay stage 402a is currently low. Therefore, the configuration depicted in FIG. 4(b) also provides falling edge detection logic. Persons of skill in the art would readily recognize that if the output of the edge detection logic is in the form of "negative logic," i.e. a low level indicating only the presence of a falling edge, then a NAND gate (not shown) and an OR gate (not shown) would be employed in place of AND gate 404 and NOR gate 414, respectively.

Figure 4C:
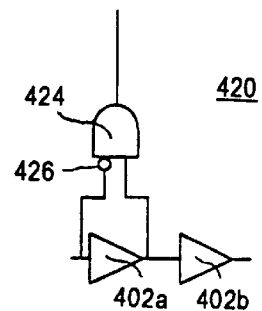
Figure 4D:
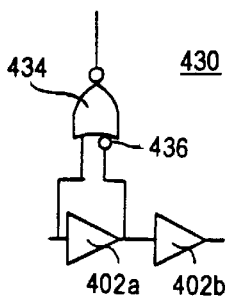

FIGS. 4(c) and 4(d) depict two implementations of rising edge detection logic 420 and 430. In these implementations 420 and 430, rising edge detection logic is provided by inverting the other input of the gate in the respective falling edge detection logic 400 and 410. Specifically, in FIG. 4(c) the input to the non-inverting delay stage 402a is inverted by inverter 426 and applied to AND gate 424, whose other input is coupled to the output of the non-inverting delay stage 402a. Thus, the output of AND gate 424 is high only when both inputs are high, that is, when the input to the non-inverting delay stage 402a is currently low and inverted by inverter 426 and when the output of the non-inverting delay stage 402a is currently high.

Moreover, in FIG. 4(d) the output to the non-inverting delay stage 402a is inverted by inverter 436 and applied to NOR gate 434, whose other input is coupled to the input of the non-inverting delay stage 402a. Thus, the output of NOR gate 434 is high only when both inputs are low, that is, when the output to the non-inverting delay stage 402a is currently high and inverted by inverter 436 and when the input of the non-inverting delay stage 402a is currently low. Persons of skill in the art would readily recognize that if the output of the edge detection logic is in the form of "negative logic," i.e. a low level indicating only the presence of a rising edge, then a NAND gate (not shown) and an OR (not shown) would be employed in place of AND gate 424 and NOR gate 434, respectively.

Figure 4E:
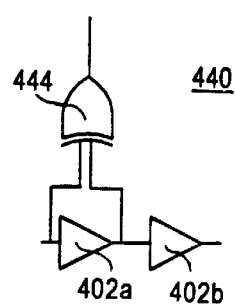

Referring to FIG. 4(e) depicted is edge detection logic 440 for detecting both rising and falling edges in a pulse currently being delayed by delay stage 402a. Specifically, edge detection logic 440 comprises an exclusive OR (XOR) gate 444, which outputs a high level only if the level of one of the inputs is different from the other, that is, when either edge, rising or falling, is currently being delayed by delay stage 402a. Persons of skill in the art would readily recognize that if the output of the edge detection logic 440 is in the form of "negative logic," i.e. a low level indicating only the presence of a rising edge, then an XNOR gate (exclusive nor, not shown) would be employed in place of XOR gate 444.

Figure 5A:
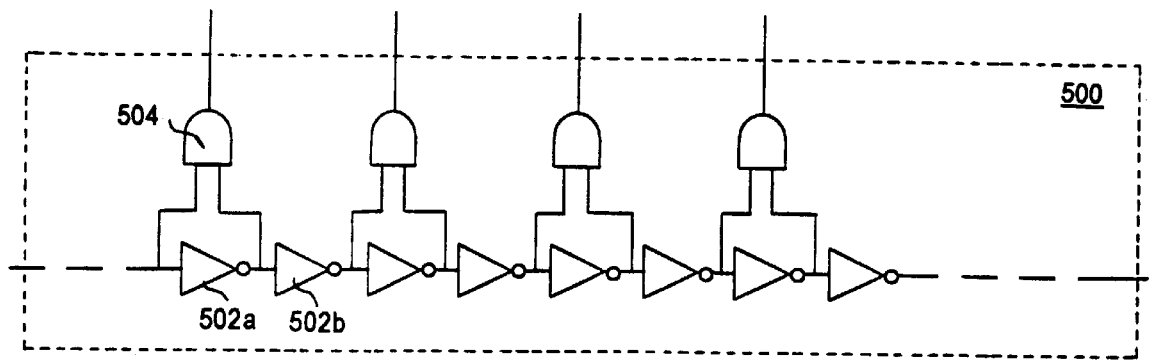
FIGS. 5(a) to 5(c) are circuit diagrams of edge detection logic that may be implemented in conjunction with an inverting delay stage.
Figure 5B:
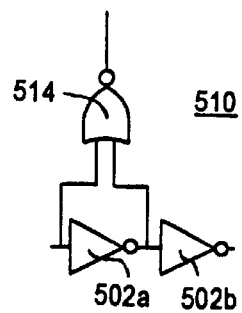
Figure 5C:
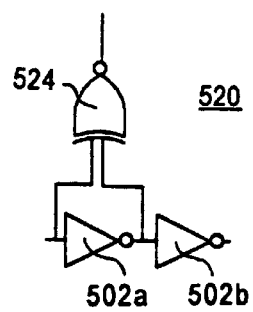

If, on the other hand, the delay stages 302a and 302b are implemented by inverting delay stages 320, then the edge detection logic 304 may be implemented according to the configurations depicted in FIGS. 5(a) to 5(c). In FIG. 5(a), falling edge detection logic 500 may be implemented with an AND gate 504 coupled to the input and output of inverting delay stage 502a. The AND gate 504 outputs a high level only if both inputs are high, that is, if the input to inverting delay stage 502a is high and the inverted output of inverting delay stage 502a is high, which occurs when there is a falling edge in the pulse currently delayed by delay state 502a.

Similarly, a NOR gate 514 in FIG. 5 (b) coupled to the input and the output of inverting delay stage 502a can detect the presence of rising edges and XNOR gate 524 in FIG. 5(c) coupled to the input and the output of inverting delay stage 502a can detect the presence of either a falling edge or a rising edge in a pulse. Persons of skill in the art would readily recognize that if the output of the edge detection logic is in the form of "negative logic," i.e. a low level indicating only the presence of an edge, then a NAND gate (not shown), an OR (not shown), and an XOR gate (not shown) would be employed in place of AND gate 504, NOR gate 514, and XNOR gate 524, respectively.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A detector for determining a Doppler shift between a transmit signal and a receive signal, comprising:

a plurality of delay stages coupled in series arranged to receive and repeatedly delay said receive signal;

signal detection logic coupled to inputs of selected delay stages from among said plurality of delay stages and outputs of the selected delay stages for outputting a signal indicative of a prescribed characteristic of the receive signal at respective selected delay stages;

a plurality of counters responsive to a common clock signal and coupled to the signal detection logic for counting respective numbers of prescribed characteristics of the receive signal at respective selected delay stages;

period detection logic coupled to said plurality of counters for determining the period of the receive signal based on the counted numbers of prescribed characteristics of the receive signal; and Doppler shift detection logic coupled to said period detection logic for determining a Doppler shift between said transmit signal and said receive signal based on the period of the transmit signal and said determined period of the receive signal.

2. The detector of claim 1, wherein the prescribed characteristic of the receive signal is an edge in the receive signal.

3. The detector of claim 1, wherein said period detection logic includes:

tap point logic coupled to said signal detection logic for determining a mean position of the detected prescribed characteristics of the receive signal based on the counted numbers of prescribed characteristics; and calculation logic for determining the period of the receive signal based on the determined mean position of the detected prescribed characteristics of the receive signal.

4. The detector of claim 1, wherein said plurality of counters is arranged to receive said transmit signal as said common clock signal.

5. The detector of claim 1, wherein said plurality of counters is arranged to receive said transmit signal as said common clock signal.

6. The detector of claim 5, wherein said period detection logic includes:

tap point logic coupled to said signal detection logic for determining a mean position of the detected prescribed characteristics of the receive signal based on the counted numbers of prescribed characteristics; and calculation logic for determining the period of the receive signal based on the determined mean position of the detected prescribed characteristics of the receive signal.

7. The detector of claim 1, further comprising:

a second plurality of delay stages coupled in series arranged to receive said transmit signal;

second signal detection logic coupled to inputs of selected delay stages from among said second plurality of delay stages and outputs of the selected delay stages for outputting a signal indicative of a prescribed characteristic of the transmit signal at respective selected delay stages;

a second plurality of counters responsive to a common clock signal and coupled to the second signal detection logic for counting respective numbers of prescribed characteristics of the transmit signal at respective selected delay stages; and second period detection logic coupled to said second plurality of counters for determining the period of the receive signal based on the counted numbers of prescribed characteristics of the receive signal;

wherein said Doppler shift detection logic is further configured to determine the Doppler shift between said transmit signal and said receive signal based on said determined period of the transmit signal and said determined period of the receive signal.

8. The detector of claim 7, wherein said second period detect on logic includes:

second tap point logic coupled to said signal detection logic for determining a mean position of the detected prescribed characteristics of the transmit signal based on the counted numbers of prescribed characteristics; and second calculation logic for determining the period of the transmit signal based on the determined mean position of the detected prescribed characteristics of the transmit signal.

9. The detector of claim 7, wherein said second plurality of counters is arranged to receive said transmit signal as said common clock signal.

10. The detector of claim 1, further comprising an oscillator for generating said transmit signal.

11. A method of detecting a Doppler shift between a transmit signal and a receive signal, said method comprising the steps of:

repeatedly delaying by a common delay period the receive signal;

detecting a prescribed characteristic in the repeatedly delayed receive signal;

determining the period of the receive signal based on said detected prescribed characteristic; and determining the Doppler shift between the transmit signal based on the period of the transmit signal and the determined period of the receive signal.

12. The method of claim 11, wherein the step of detecting a prescribed characteristic in the repeatedly delayed receive signal includes the step of detecting edges in the repeatedly delayed receive signal.

13. The method of claim 12, wherein the step of determining the period of the receive signal based on said detected prescribed characteristic includes the steps of:

counting the number of detected edges in the repeatedly delayed receive signal in response to a clock signal;

determining a mean position of the detected edges based on the counted number of detected edges in the repeatedly delayed receive signal; and determining the period of the receive signal based on the determined mean position of the detected edges in the repeatedly delayed receive signal.

14. The method of claim 13, wherein the step of counting the number of detected edges in the repeatedly delayed receive signal in response to a clock signal includes the step of counting the number of detected edges in the repeated delayed receive signal in response to the transmit signal.

15. The method of claim 13, wherein the step of counting the number of detected edges in the repeatedly delayed receive signal in response to a clock signal includes the step of counting the number of detected edges in the repeated delayed receive signal in response to the receive signal.

16. The method of claim 11, further comprising the step of determining the period of the transmit signal.

17. The method of claim 16, wherein the step of determining the period of the transmit signal includes the steps of:

repeatedly delaying by a common delay period the receive signal;

detecting a prescribed characteristic in the repeatedly delayed transmit signal; and determining the period of the transmit signal based on said detected prescribed characteristic.

18. The method of claim 17, wherein the step of detecting a prescribed characteristic in the repeatedly delayed transmit signal includes the step of detecting edges in the repeatedly delayed transmit signal.

19. The method of claim 18, wherein the step of determining the period of the transmit signal based on said detected prescribed characteristic includes the steps of:

counting the number of detected edges in the repeatedly delayed transmit signal in response to a clock signal;

determining a mean position of the detected edges based on the counted number of detected edges in the repeatedly delayed transmit signal; and determining the period of the receive signal based on the determined mean position of the detected edges in the repeatedly delayed transmit signal.

20. The method of claim 19, wherein the step of counting the number of detected edges in the repeatedly delayed transmit signal in response to a clock signal includes the step of counting the number of detected edges in the repeated delayed transmit signal in response to the transmit signal.

21. The method of claim 11, further comprising the step of calibrating the common delay period.

\* \* \* \* \*

UNITED STATES PATENT AND TRADEMARK OFFICE
CERTIFICATE OF CORRECTION

PATENT NO. : 5,900,834
DATED : May 4, 1999
INVENTOR(S) : James J. Kubinec

It is certified that error appears in the above-identified patent and that said Letters Patent is hereby corrected as shown below:

In the Claims, in Claim 8, line 22, change "detect on" to --detection--

Signed and Sealed this

Nineteenth Day of October, 1999

Attest:

Q. TODD DICKINSON

*Attesting Officer*  *Acting Commissioner of Patents and Trademarks*